(12) United States Patent
Le et al.

(10) Patent No.: US 7,343,490 B2
(45) Date of Patent: Mar. 11, 2008

(54) APPARATUS, AND ASSOCIATED METHOD, FOR FACILITATING AUTHENTICATION OF A MOBILE STATION WITH A CORE NETWORK

(75) Inventors: Khiem Le, Coppell, TX (US); Franck Le, Irving, TX (US)

(73) Assignee: Nokia Siemens Networks Oy, Espoo (FI)

( * ) Notice: Subject to any disclaimer, the term of this patent is extended or adjusted under 35 U.S.C. 154(b) by 709 days.

(21) Appl. No.: 10/000,173

(22) Filed: Nov. 30, 2001

(65) Prior Publication Data

US 2003/0105962 A1 Jun. 5, 2003

(51) Int. Cl.
*H04L 9/00* (2006.01)
*H04K 1/00* (2006.01)
*G06F 7/04* (2006.01)

(52) U.S. Cl. .................. 713/170; 380/270; 726/2
(58) Field of Classification Search ............. 713/170; 380/270; 726/2
See application file for complete search history.

(56) References Cited

U.S. PATENT DOCUMENTS 6,061,650 A * 5/2000 Malkin et al. ............. 704/228
6,973,057 B1 * 12/2005 Forslow .................... 370/328
2001/0009025 A1 * 7/2001 Ahonen .................... 713/161
2002/0019985 A1 * 2/2002 Fuccello et al. ........... 725/133
2003/0032414 A1 * 2/2003 Melaku et al. ............ 455/415

* cited by examiner

Primary Examiner—Kambiz Zand
Assistant Examiner—Christopher J Brown
(74) Attorney, Agent, or Firm—Lackenbach Siegel LLP; Robert M. Bauer (57) ABSTRACT

Apparatus, and an associated method, facilitates authentication of a mobile station operable in a 3G cellular communication system having a core network and a plurality of access networks. A standard signaling protocol is used to communicate between an access network and the core network. When a request for authentication of a mobile station is generated, a signaling protocol message is generated at a proxy of the access network within which the mobile station is to be authenticated. Detection of the authentication request is made at the proxy, and a message is generated at the proxy which includes indicia associated with the authentication center associated with the access network. The signaling protocol message is sent to the core network, and the information indicia contained therein is used to facilitate authentication procedures to authenticate the mobile station.

18 Claims, 4 Drawing Sheets

APPARATUS, AND ASSOCIATED METHOD, FOR FACILITATING AUTHENTICATION OF A MOBILE STATION WITH A CORE NETWORK

BACKGROUND OF THE INVENTION

1. Field of the Invention

The present invention relates generally to a manner by which to authenticate a mobile station in a cellular, or other radio, communication system, such as a 3G (Third Generation) system having an IP (Internet Protocol)—core network and one or more access networks. More particularly, the present invention relates to apparatus, and an associated method, by which to provide authentication-related information to a core network, and an authentication center connected thereto, to be used pursuant to authentication procedures to authenticate the mobile station. The information is contained in one or more fields of a signaling protocol message used in the communication system to communicate at least between the access network and the IP-core network. When SIP (Session Initiation Protocol) messages are communicated between the access and core networks, a field is added to an SIP invite, or other, message, and populated with the information.

2. Description of the Prior Art

A communication system is operable to communicate data between a sending station and a receiving station upon a communication channel. Data to be communicated by the sending station to the receiving station is converted, if necessary, into a form to permit communication of the data upon the communication channel to be detected, subsequently, at the receiving station. Subsequent to detection of the data at the receiving station, the receiving station operates to recover the informational content of the data.

Advancements in communication technologies have permitted the development, and implementation, of many different types of communication systems. Different types of communication systems provide, for instance, variously half-simplex, half-duplex, and full duplex communication schemes. Pursuant to such various communication systems, the data to be communicated by the sending station to the receiving station is communicated in electrical form by way of wire line connections interconnecting the sending and receiving stations, as well as in electromagnetic form by way of radio links formed between the sending and receiving stations.

A communication system in which the data to be communicated between the sending and receiving station is converted into electromagnetic form to be communicated upon communication channels defined upon a radio link extending between the sending and receiving stations is referred to as a radio communication system. In contrast to a conventional wire line communication system which requires electrical connections to be formed between the sending and receiving stations, a radio communication system is inherently mobile. That is to say, because radio links, rather than wire line connections, interconnect the sending and receiving stations, the sending and receiving stations need not be positioned in fixed locations, connected to the wire lines interconnecting the sending and receiving stations, to permit communications to be effectuated therebetween.

A cellular communication system is a type of radio communication system which has achieved wide levels of usage and which has been installed throughout extensive portions of the world. Successive generations of cellular communication systems have been developed. Reference is commonly made to at least three generations of cellular communication systems. A so-called, first-generation, cellular communication system generally refers to a cellular communication system which utilizes an analog modulation technique. An AMPS (Advanced Mobile Phone Service) cellular communication system is exemplary of a first-generation cellular communication system. A so-called, second-generation, cellular communication system typically refers to a cellular communication system which utilizes a digital, multiple-access communication scheme. A GSM (Global System for Mobile communications) cellular communication system and an IS-95 (Interim Standard-1995), CDMA (Codes-Division, Multiple-Access) cellular communication system are each exemplary of a second generation cellular communication system.

Third-generation, cellular communication systems are presently under development. Third-generation, cellular communication systems refer generally to cellular communication systems intended to provide universal communication services, including the effectuation of data services, voice services, and multi-media services. Proposals for third-generation, cellular communication systems generally provide for IP (Internet Protocol)-formatted data. At least one such proposal provides for an IP-core network to which access networks are connectable. The access networks may also include a third-generation network, as well as one or more legacy networks.

A legacy network is a network operable pursuant to a second, or even first, generation, cellular communication standard. When a mobile station commences registration procedures or initiates origination of a communication session, signaling is effectuated with the access network with which the mobile station is operable. Authentication procedures must be carried out to authenticate the identity of the mobile station. Authentication data are exchanged between the mobile station and the core network at which an authentication center associated with the mobile station is coupled. Information must be provided to the core network of the authentication request in order to permit the authentication procedures to be carried out properly.

As access networks operable pursuant to different standards are anticipated to be connected to a single core network, the core network must be capable of supporting authentication procedures to mobile stations requesting authentication by any of the access networks.

A manner is, therefore, required by which to provide the necessary information to the core network to facilitate the effectuation of authentication procedures to authenticate the mobile station.

It is in light of this background information related to authentication of a mobile station in a cellular communication system that the significant improvements of the present invention have evolved.

SUMMARY OF THE INVENTION

The present invention, accordingly, advantageously provides apparatus, and an associated method, by which to authenticate a mobile station in a cellular, or other radio, communication system, such as a 3G (Third Generation) system having a IP-core network and one or more access networks.

Through operation of an embodiment of the present invention, a manner is provided by which to provide authentication-related information to a core network, and an authentication center connected thereto to be used to authenticate the mobile station.

The authentication-related information is contained in one, or more, fields of a signaling protocol message used in the communication system to communicate at least between the access network and the IP-core network. The information is carried in the signaling protocol message to inform the core network of the type of authentication procedure to be performed as well as identification of an address, or other indicia, associated with the location of the authentication center which is to be accessed pursuant to authentication procedures by which to authenticate the mobile station.

In one aspect of the present invention, the network portion of a communication system includes a plurality of access networks, each connected to a core network. A standard signaling protocol, such as SIP (Session Interaction Protocol), is utilized to effectuate signaling between the access networks and the core networks. Pursuant to a registration, call origination, or other request, a mobile station attaches to an access network upon authentication of the mobile station to communicate therethrough. The authentication center responsible for verifying the validity of the user is connected to the core network. An existing signaling protocol message is adapted, or a new signaling protocol message is formed, which includes information facilitating the authentication procedure by which the mobile station is authenticated.

In another aspect of the present invention, fields are appended to an existing signaling protocol message, such as an SIP invite message. A first field is populated with indicia of values which identify, such as with an IP address or another form of identifier such as a host name, the authentication center. Many access networks may be connected to the IP core network and when roaming in one of these access networks, the user must be authenticated by an authentication center specific to the access network the user is currently visiting A second field is populated with values which identify the authentication method by which the authentication procedure is carried out. One, or both, of the fields are included in a signaling protocol message. And, the signaling protocol message is communicated by the access network to the core network.

If the mobile node can include the previously identified information, it should do so to allow the authentication and other security procedures to be performed. Otherwise, a proxy, positioned at the access network through which the mobile station communicates, adds these fields. This can, for example, be the case when the user is roaming in a legacy access network where the protocol used within the access network is not modified since already optimized for this specific access link and for backward compatibility, but the protocol used within the IP core network to register, initiate or receive call is a different protocol such as e.g. SIP. In such case, a proxy converts the two protocols and, in addition, inserts the previously identified information. When an authentication request is generated, such as pursuant to registration or call origination procedures, the request is routed to the proxy associated with, and forming a portion of, the access network through which the request is delivered and routed. The proxy detects the request and forms a signaling protocol message to be forwarded on to the home network. The signaling protocol message includes fields identifying the identity of the authentication center and the type of authentication procedures to be performed. The identity of the authentication center comprises, for instance, the IP address associated with the authentication center. And, the authentication type comprises, for instance, the authentication algorithm utilized by the access network to authenticate mobile stations to be operable therein.

In one implementation, an identifier is provided for a communication system having a plurality of access networks, each coupled to an IP core network. Separate authentication centers, associated with each of the access networks, are connected to the core network. A mobile station operable in a selected access network initiates authentication procedures pursuant to a registration, or other, procedure. The authentication request is routed to a proxy located at the access network through which the mobile station is operable to communicate. The mobile station is operable, for instance, pursuant to the IS-95 standard and the access network through which the mobile station communicates is also operable pursuant to the IS-95 standard, forming an IS-95 access network.

The authentication request is routed through the access network to a proxy which generates a mobile IP(MIP), SIP, or other signaling protocol message to be communicated to the core network. The message generated by the proxy includes a field identifying the identity of the authentication center associated with the IS-95 access network. A second field is further included in the signaling protocol message and is populated with the values indicating the algorithm to be used to authenticate the mobile station. In an IS-95 network, a CAVE algorithm is used to authenticate the mobile station. The second field of the signaling protocol message is populated with values representative of the CAVE algorithm. The signaling protocol message is forwarded to the home network and routed therethrough to the appropriate authentication center, and authentication procedures are commenced to authenticate the mobile station.

In these and other aspects, therefore, apparatus, and an associated method, is provided for a communication system having a network part, including at least a first access network portion and a core network portion. The at least the first access network portion is coupled to the core network portion. The communication system has a mobile station operable to communicate by way of at least a selected access network portion of the at least the first access network portion once authenticated through interaction with a selected authenticator associated with the selected access network portion. Authentication of the mobile station to communicate in the communication system is facilitated. An identifier is coupled to receive an indication of an authentication request requesting authentication of the mobile station through interaction with the selected authenticator. The identifier identifies indicia associated with the selected authenticator. The indicia is used to facilitate delivery of the authentication request to the selected authenticator.

A more complete appreciation of the present invention and the scope thereof can be obtained from the accompanying drawings which are briefly summarized below, the detailed description of the presently preferred embodiments of the invention, and the appended claims.

DETAILED DESCRIPTION OF THE DRAWINGS

Figure 1:
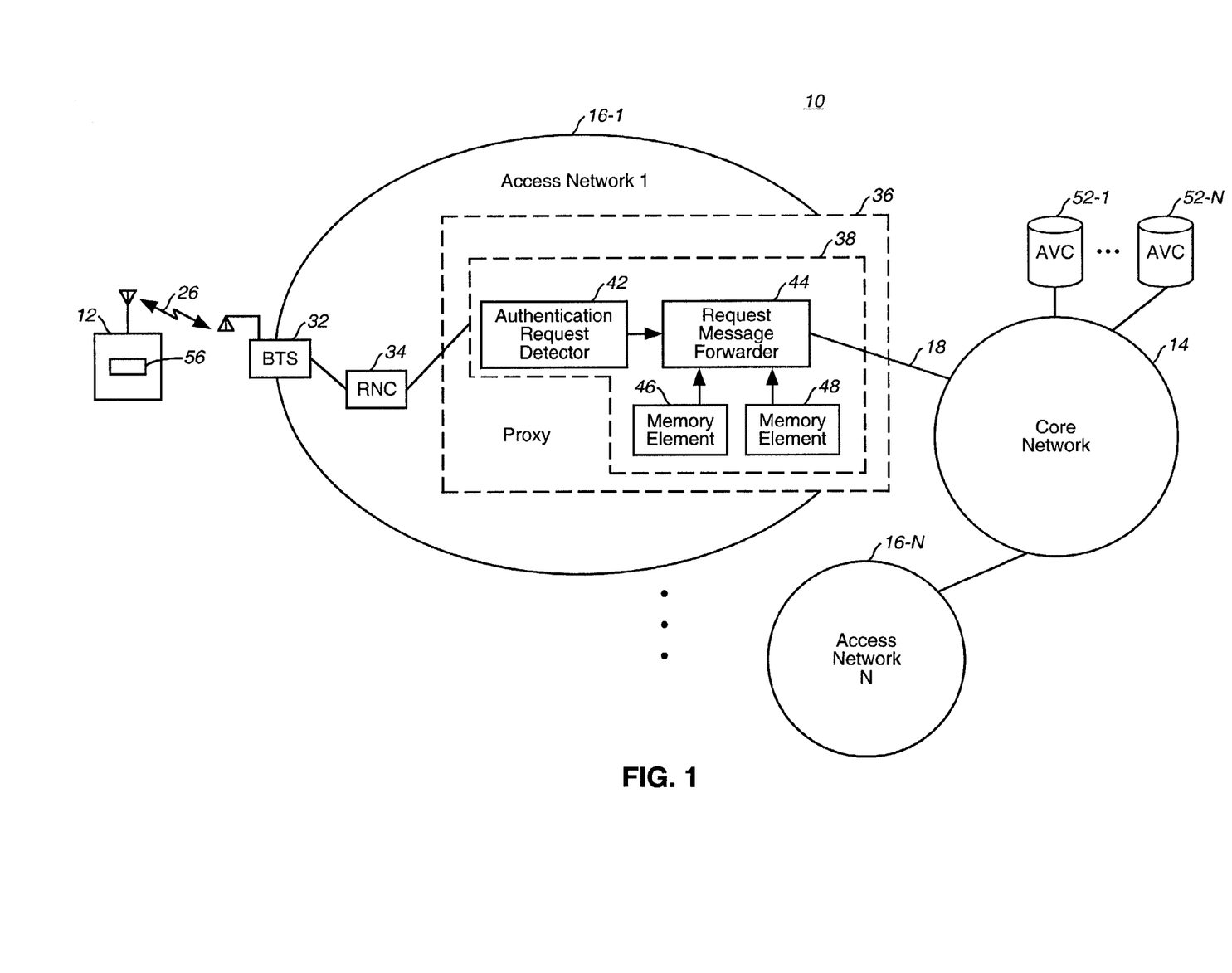
FIG. 1 illustrates a functional block diagram of a communication system in which an embodiment of the present invention is operable.

Referring first to FIG. 1, communication system, shown generally at 10, provides for the effectuation of communication services with a mobile station 12. The mobile station 12 is operable pursuant to a selected cellular communication standard, here the IS-95 (Interim Standard-1995) standard. While, for purposes of example, the mobile station 12 shall be described with respect to its implementation as an IS-95 terminal, operation of an embodiment of the present invention can be analogously represented with respect to a mobile station operable pursuant to any of various other types of cellular, and other radio, communication standards. Other types of mobile stations are operable with other portions of the communication system 10 to communicate therein.

The communication system also includes a fixed network, including a core network 14, and a plurality of access networks 16-1 through 16-n of which two access networks are illustrated in the figure. The access networks are coupled to the core network, here indicated by the line 18 interconnecting the access network 16-1 with the core network and by the line 22 connecting the access network 16-n with the core network. The core network is an IP-based network.

The access networks, in contrast, are representative of access networks which are operable pursuant to any of various different communication schemes, such as various cellular communication standards. Here, the access network 16-1 is instructed to be operable pursuant to the IS-95 cellular communication standard. The access network 16-n is here representative of an access network operable pursuant to another communication standard, such as a UTRAN or GERAN, or other cellular, radio or technology access network standard.

The mobile station 12 is operable to communicate with the access network 16-1 by way of an access link, e.g., radio links, here represented by the arrow 26, upon communication channels defined thereon. Prior to effectuation of a communication session with the mobile station, the mobile station must be authenticated to make sure it is a valid and authorized user. Attachment of the mobile station to the network of the communication system necessitates the authentication of the mobile station to communicate therein.

The mobile station is authenticated pursuant to the authentication procedures required of the communication system standard pursuant to which the access network to which the mobile station is to be attached requires. In the exemplary scenario in which the mobile station 12 and the access network 16-1 are operable pursuant to the IS-95 cellular communication standard, the authentication of the mobile station is carried out through effectuation of the authentication procedure associated with the communication system standards. Here, as the mobile station 12 and the access network 16-1 are operable pursuant to the IS-95 standard, authentication is carried out using the CAVE algorithm.

Mobile stations attempting to become attached to other access networks analogously are authenticated pursuant to the authentication procedure defined in the communication standard pursuant to the access network to which the mobile station is to be attached is operable. For instance, if the access network is operable pursuant to a WCDMA (Wide band Code-Division, Multiple-Access) communication standard, a mobile station operable pursuant to such standard and attempting to attach to the access network is authenticated to communicate therein through a UMTS Authentication and Key Agreement procedure. Authentication methods used pursuant to other communication standards are analogously utilized to authenticate the mobile station to communicate by way of the associated access network.

The authentication procedure is performed, e.g., during registration procedures subsequent to turn-on of a mobile station or entry into a coverage area encompassed by a particular access network. Authentication can also be performed at other events, such as Mobile Originated Call and Mobile Terminated Call, depending on the mobile node, the network policies and the access network technology where the user is roaming.

Authentication can be carried out pursuant to a call origination request initiated at the mobile station and additionally performed at other times or responsive to other events.

The access network 16-1 includes various network structure including base transceiver stations (BTSs) of which the base transceiver station 32 is representative, and a radio network controller (RNC) 34 to which the base transceiver station is coupled. The access network also includes a proxy 36 of an embodiment of the present invention. When a mobile station is to be authenticated, an authentication request is routed through the access network to the proxy. The proxy, in turn, generates a signaling protocol message using a standardized, or other, signaling protocol to communicate indicia associated with the authentication procedure to the core network. The signaling protocol message is formed of, for instance, an MIP (Mobile Internet Protocol) message or an SIP (Session Interactive Protocol) message, or the like.

The proxy 36 is here shown to include an identifier 38 formed of an authentication request detector 42, a request message forward 44, and, here, memory elements 46 and 48. The authentication request detector is operable to detect generation of an authentication request routed to the proxy. Responsive to detection of the authentication request, the request message forwarder is operable to generate a signaling protocol message for communication to the core network. Here, the message generated by the request message forward includes indicia retrieved from the memory elements 56 and 58. The memory element 46 is representative of the memory location at which indicia associated with the type of authentication procedure, such as the CAVE algorithm, is to be performed to authenticate the mobile station. The memory element 48 stores indicia associated with a location connected to the core network at which at least portions of the authentication procedure are performed. The indicia retrieved from the memory elements 46 and 48, or otherwise obtained, are to populate newly defined fields of the message formed by, and forwarded by, the forwarder 44.

A plurality of authentication centers, here the authentication centers 52-1 through 52-n, are connected to the core network. The authentication centers are identified by IP addresses or other identifiers such as a host name. A functionally-separate authentication center is associated with each of the access networks 16. One of the authentication centers, here the authentication center 52-1, is associated with the access network 16-1. This authentication center has the specific algorithm and information to perform and verify the authentication in the specific access network. When an authentication request is generated by the mobile station 12, the request is routed to the proxy 36 at which a standard-protocol message is generated and communicated to the core network. Fields contained in the standard-protocol message identify the authentication center 52-1 by its identity to permit routing of an authentication request thereto.

Signaling between the authentication center and the mobile station is thereafter effectuated to authenticate the mobile station to communicate in the access network 16-1. Mobile stations requesting authentication to communicate with other access networks are analogously authenticated through routing of a message to an appropriate authentication center connected to the core network.

In order to authenticate the mobile station and distribute encryption keys used pursuant to authentication procedures, the core network is informed of the security scheme associated with the access network. The information is contained in the signaling protocols communicated between the access network and the core network to inform the core network of the authentication procedure which is to be performed. A conventional signaling protocol, such as SIP or MIP, is utilized to communicate the information, and the information is contained in an extension of an SIP or an MIP message. The information specifies, for example, which type of authentication procedure is to be performed. When subsequent access network-types are implemented, new authentication centers can be added to the core network, new information indicia appended to the signaling protocol message, thereby to permit authentication procedures to be carried out with the subsequently-installed access networks.

In an alternate implementation, if the mobile station has the capability and supports the required protocols (e.g. MIP, SIP) the functionality provided by the proxy 36 is instead carried out at the mobile station 12. In the figure, the element 56 located at the mobile station is representative of the functionality of the proxy. In this alternate implementation, the indicia stored at the memory elements 46 and 48 are stored at the element 56, or otherwise provided to the mobile station. When the mobile station is to be authenticated, the information is provided by the element 56 to be sent to the radio link 26, routed through the access network 16-1, forwarded by way of the link 18, and routed through the core network 14 to the appropriate authentication center. Authentication procedures are thereby effectuated to authenticate the mobile station to communicate by way of the access network.

Figure 2:
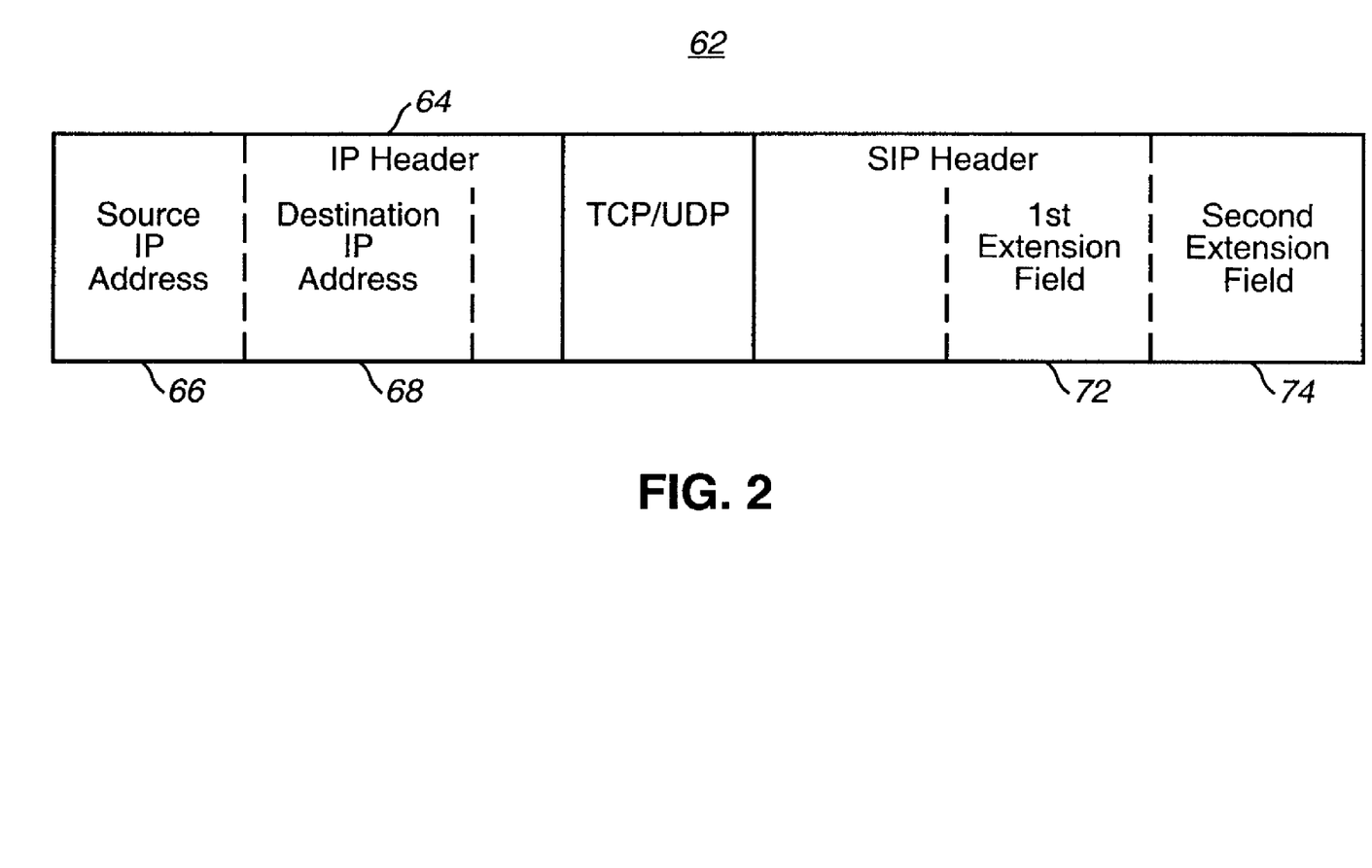
FIG. 2 illustrates a representation of a signaling protocol message generated during operation of an embodiment of the present invention.

FIG. 2 illustrates an exemplary message generated by the proxy 36 pursuant to an embodiment of the present invention. Here, an exemplary SIP invite message is represented. Other messages formed pursuant to other signaling protocol schemes can analogously be represented. Here, the invite message, shown generally at 62, include standard SIP invite values 64 with the IP header, source IP address 66 and destination IP address 68. Appended to the standard values are additional extension fields formed pursuant to an embodiment of the present invention. Here, two additional extension fields are appended to the standard values, a first extension field 72 and a second extension field 74. The first extension field is populated with identity indicia, such as the IP address or host name, of the authentication center which is to be utilized to authenticate the mobile station. And, the second extension field is populated with values identifying the type of authentication procedure, such as a CAVE algorithm and the procedure (e.g. global challenge, etc.) to be performed to authenticate the mobile station.

Figure 3:
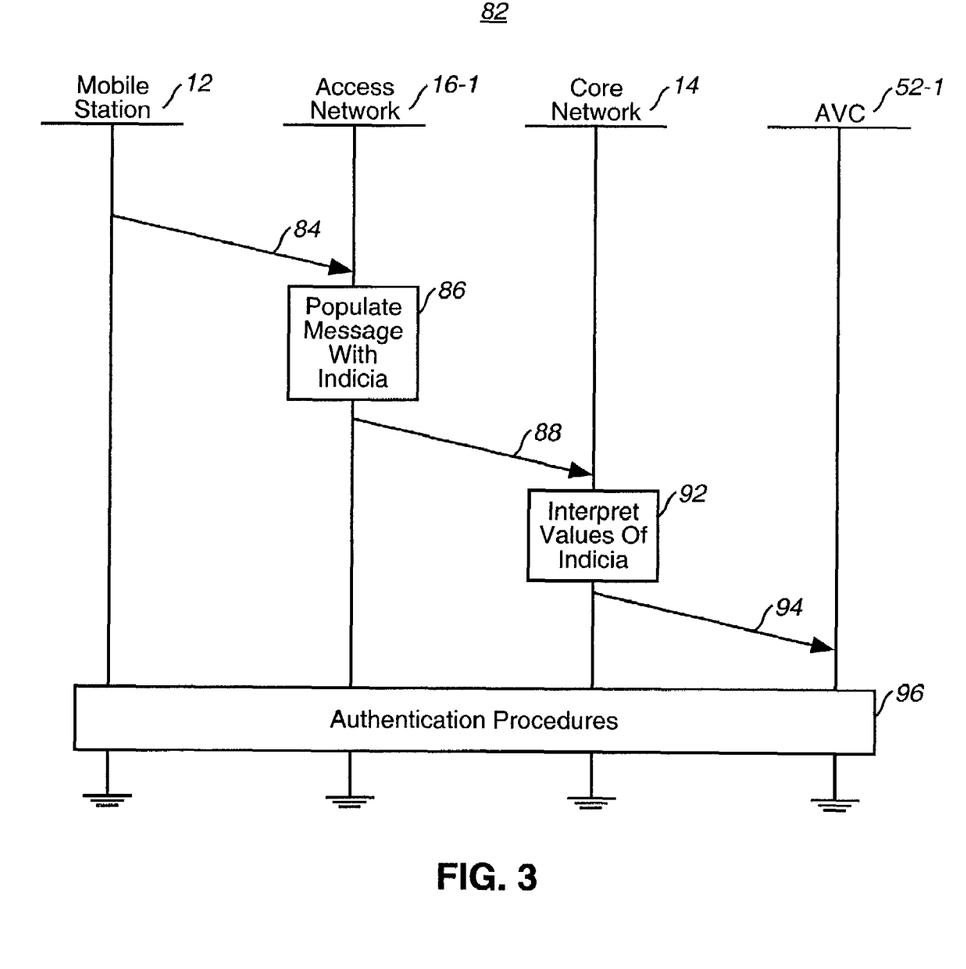
FIG. 3 illustrates a message sequence diagram illustrating signaling generated during operation of the communication system shown in FIG. 1.

FIG. 3 illustrates a message sequence diagram, shown generally at 82, representative of signaling generated during operation of the communication system 10, shown in FIG. 1. Pursuant to a registration procedure, or other event such as a call origination procedure, an authentication request is generated by the mobile station, indicated by the segment 84. The request is delivered to the access network 16-1. The request is routed through the access network to the proxy 36 (shown in FIG. 1) thereof, whereat the fields of the standard signaling protocol message are populated, indicated by the block 86, with information indicia representative of the authentication procedure to be performed and the address of an authentication center with which the mobile station interacts to effectuate authentication of the mobile station. The signaling protocol message is then forwarded to the appropriate authentication center, here the authentication center 52-1. Some process on the information added by the proxy may be required to route the message to the authentication center as shown by the arrows 88 and 92. Authentication procedures, indicated by the block 96, such as exchange of encryption keys, are carried out to authenticate the mobile station. Once the authentication procedures are performed, the mobile station becomes attached to the access network to permit effectuation of a communication session with the mobile station.

Figure 4:
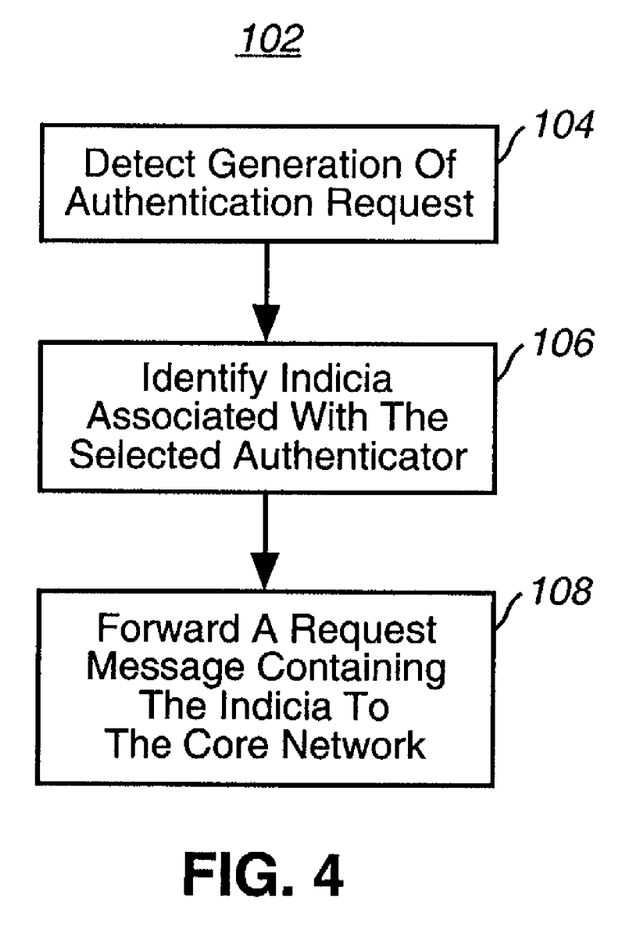
FIG. 4 illustrates a method flow diagram listing the method steps of the method of operation of an embodiment of the present invention.

FIG. 4 illustrates a method, shown generally at 102, of an embodiment of the present invention. The method facilitates authentication of a mobile station to communicate in a communication system having an access network and a core network. An authentication center required to be accessed by the mobile station pursuant to an authentication procedure is connected to the core network and is accessible therethrough.

First, and as indicated by the block 104, generation of an authentication request is detected. The authentication request requests authentication of the mobile station through interaction with the authenticator. Then, and as indicated by the block 106, indicia associated with the selected authenticator is identified. The indicia is used to facilitate delivery of the authentication request to the selected authenticator.

Thereafter, and as indicated by the block 108, a request message including the identified indicia associated with the authenticator is forwarded to the core network and, in turn, to the authenticator. Authentication procedures thereafter commence.

Thereby, a manner is provided by which to facilitate authentication of a mobile station in a cellular communication system having a core network and access networks. When an authentication request is generated, information indicia associated with the authenticator is added to a signaling protocol message which is communicated by the access network to the core network and used there to facilitate the effectuation of authentication procedures to authenticate the mobile station.

The preferred descriptions are of the preferred examples for implementing the invention, and the scope of the invention should not necessarily be limited by this description. The scope of the present invention is defined by the following claims.

The invention claimed is:

1. An apparatus for facilitating authentication of a mobile station to communicate in a communication system, wherein the communication system includes a network part including plurality of access network portions and a core network portion, the plurality of access network portions being coupled to the core network portion, a plurality of authenticators coupled to the core network portion, each authenticator being associated with one of the plurality of access network portions, the apparatus comprising:

an identifier coupled to the mobile station and the core network portion, said identifier being formed of a proxy located at an access network portion selected from said plurality of access network portions, said proxy for converting a protocol used within an access network portion into a signaling protocol used within the core network portion, said identifier for detecting generation of an authentication request in accordance with said access network protocol, the authentication request requesting authentication by the mobile station through interaction with a selected authenticator associated with the selected access network portion, for identifying indicia associated with the selected authenticator, for generating a signaling protocol message in accordance with said signaling protocol, and for inserting the identified indicia into the generated signaling protocol message, the indicia being used to facilitate delivery of the authentication request to the selected authenticator and to specify a type of authentication procedure to be performed.

2. The apparatus of claim 1 wherein the selected authenticator is coupled to the core access network, the selected authenticator having an address associated therewith, and wherein the indicia identified by said identifier and used to facilitate delivery of the authentication request to the selected authenticator comprises address indicia representative of the address associated with the selected authenticator.

3. The apparatus of claim 1 wherein the selected authenticator authenticates the mobile station through effectuation of a selected authentication method, and wherein the indicia identified by said identifier and used to facilitate delivery of the authentication request comprises authentication-method indicia representative of the selected authentication method.

4. The apparatus of claim 1, wherein the indicia identified by said identifier identifies which of the plurality of authenticators to which the authentication request is to be delivered.

5. The apparatus of claim 4, wherein the indicia identifying which of the plurality of authenticators that the authentication request is to be delivered to is identified by said identifier responsive to identification through the selected access network portion through which the authentication request is made.

6. The apparatus of claim 1 wherein said identifier is positioned at the mobile station.

7. The apparatus of claim 1 wherein the mobile station is operable to originate a communication session there from and wherein said identifier identifies the indicia pursuant to origination by the mobile station of the communication station.

8. The apparatus of claim 1 wherein the mobile station is operable to initiate a registration procedure and wherein said identifier identifies the indicia pursuant to the registration procedure initiated by the mobile station.

9. A method of authenticating a mobile station to communicate in a communication system having a network part including plurality of a access network portions and a core network portion, the plurality of access network portions being coupled to the core network portion, said mobile station operable to communicate by way of at least one selected access network portion of the plurality of access network portions once authenticated comprising, the steps of:

detecting generation of an authentication request in accordance with an access network protocol, the authentication request requesting authentication by the mobile station through interaction with an authenticator selected from a plurality of authenticators coupled to the core network portion, each authenticator being associated with one of the plurality of access network portions, the selected authenticator being associated with a selected access network portion;

identifying indicia associated with the selected authenticator;

generating a signaling protocol message in accordance with said access network protocol; and inserting the identified indicia into the generated signaling protocol message, the indicia being used to facilitate delivery of the authentication request to the selected authenticator and to specify a type of authentication procedure to performed.

10. The method of claim 9 wherein the indicia associated with the selected authenticator and identified during said operation of identifying comprises indicia representative of address indicia associated with the selected authenticator.

11. The method of claim 9 wherein the selected authenticator authenticates the mobile station through effectuation of a selected authentication method, and wherein the indicia associated with the selected authenticator identified during said operation of identifying comprises authentication-method indicia representative of the selected authentication method.

12. The method of claim 9 further comprising the operation of forwarding a request message representative of the authentication request, the request message including the indicia associated with the authenticator.

13. The method of claim 12 wherein the request message forwarded during said operation of forwarding comprises a signaling protocol message containing an indicia field containing values representative of the indicia identified during said operation of identifying.

14. A communication system comprising:

a network part including a plurality of access network portions and a core network portion, the plurality of access network portions being coupled to the core network portion, a plurality of authenticators coupled to the core network portion, each authenticator being associated with one of the plurality of access network portions, at least one mobile station operable to communicate by way of at least one selected access network portion of the plurality of access network portions once authenticated through interaction with a selected authenticator associated with the selected access network portion, and an apparatus for facilitating authentication of the mobile station to communicate in the communication system, said apparatus including an identifier coupled to the mobile station and the core network portion, said identifier being formed of a proxy located at the selected network access portion, said proxy for converting a protocol used within an access network portion into a signaling protocol used within the core network portion, said identifier for detecting generation of an authentication request in accordance with said access network protocol, the authentication request requesting authentication by the mobile station through interaction with the selected authenticator, for identifying indicia associated with the selected authenticator, for generating a signaling protocol message in accordance with said signaling protocol, and for inserting the identified indicia into the generated signaling protocol message, the indicia being used to facilitate delivery of the authentication request to the selected authenticator and to specify a type of authentication procedure to be performed.

15. The apparatus of claim 14, wherein the communication system utilizes a text-based signaling protocol scheme, and wherein the request message generated by said request message forwarder comprises a text-based signaling protocol message.

16. The apparatus of claim 15 wherein the request message generated by said request message forwarder comprises an indicia field, the indicia field populated with values identified by said identifier to be associated with the authenticator.

17. The apparatus of claim 16 wherein the values identified by said identifier and populated in the indicia field comprise values representative of an address associated with the selected authenticator.

18. The apparatus of claim 16 wherein the values identified by said identifier and populated in the indicia field comprise values representative of an authentication scheme pursuant to which the selected authenticator authenticates the mobile station.

* * * * *